US00RE40309E

(19) United States
(12) Reissued Patent
Lackman

(10) Patent Number: US RE40,309 E
(45) Date of Reissued Patent: May 13, 2008

(54) BELT HOLDER

(75) Inventor: Milton Lackman, Montrel (CA)

(73) Assignee: Arrow Manufacturing Incorporated, Montreal, Quebec (CA)

(21) Appl. No.: 11/104,246

(22) Filed: Apr. 12, 2005

Related U.S. Patent Documents

Reissue of:
(64) Patent No.: 6,547,065
Issued: Apr. 15, 2003
Appl. No.: 09/995,104
Filed: Nov. 27, 2001

(30) Foreign Application Priority Data

Dec. 12, 2000 (CA) ..... 2328032

(51) Int. Cl.
*B65D 85/18* (2006.01)

(52) U.S. Cl. ..... 206/278; 206/292; 206/482; 206/885

(58) Field of Classification Search ..... 206/278, 206/284, 292, 482, 775, 779; 2/311, 338; 223/85, 87; 229/87.15
See application file for complete search history.

(56) References Cited

U.S. PATENT DOCUMENTS

| | | | | |
|---|---|---|---|---|
| 1,159,743 | A | 11/1915 | Buxton | |
| 1,561,242 | A | 11/1925 | Kaye | |
| 1,580,643 | A | 4/1926 | Binder | |
| 1,697,880 | A | 1/1929 | Peter | |
| 2,415,151 | A | 2/1947 | Taylor et al. | |
| 2,488,973 | A | 11/1949 | Hall | |
| 2,850,160 | A | 9/1958 | Siebel et al. | |
| 2,868,371 | A | 1/1959 | Thorp | |
| 2,991,874 | A * | 7/1961 | Brandt | 206/284 |
| 3,044,605 | A | 7/1962 | Clement | |
| 3,173,541 | A | 3/1965 | Cummings | |
| 3,252,567 | A | 5/1966 | Baron et al. | |
| 4,506,787 | A | 3/1985 | Bruso | |
| 4,570,792 | A | 2/1986 | Conway | |
| 4,802,577 | A | 2/1989 | O'Leary | |
| 4,921,153 | A | 5/1990 | Smith | |
| 5,137,149 | A | 8/1992 | Polacek | |
| 5,577,607 | A | 11/1996 | Drake et al. | |
| 5,601,189 | A | 2/1997 | Roshdy | |
| 5,638,955 | A | 6/1997 | Calciano | |
| 6,024,213 | A * | 2/2000 | Bush et al. | 206/296 |
| 6,339,848 | B1 * | 1/2002 | Mayhood et al. | 2/338 |
| 6,360,867 | B1 | 3/2002 | Ford | |
| 6,367,478 | B1 * | 4/2002 | Riggs | 128/846 |

FOREIGN PATENT DOCUMENTS

| | | |
|---|---|---|
| FR | 1424582 | 12/1965 |
| GB | 2097668 | 11/1982 |

* cited by examiner

*Primary Examiner*—Sue A. Weaver
(74) *Attorney, Agent, or Firm*—Jon Carl Gealow

(57) ABSTRACT

A holder for an apparel belt which can be used as both a display holder and as a storage package. When used in either the display mode of the storage mode, the holder protects the belt from being scratched or otherwise physically damaged. The holder has a sleeve with an opening at one end thereof for receiving the strap of the belt, and a sleeve extension attached to the open end of the sleeve which acts as a backdrop for the exposed portion of the belt when the holder is used in its display mode and acts as a cover for the buckle when the holder is used in its storage mode. In the display mode, the holder is hung on a merchandising display rack from an orifice in the free end of the sleeve extension. [The sleeve extension has a means for retaining the buckle and a portion of the belt strap outside the sleeve to expose that portion of the belt. In the storage position, the buckle end of the belt is detached from the retaining means on the sleeve extension and the strap is more fully inserted into the sleeve. The sleeve extension is then folded over the top of the buckle and held to the front of the sleeve by a suitable attachment means.]

48 Claims, 5 Drawing Sheets

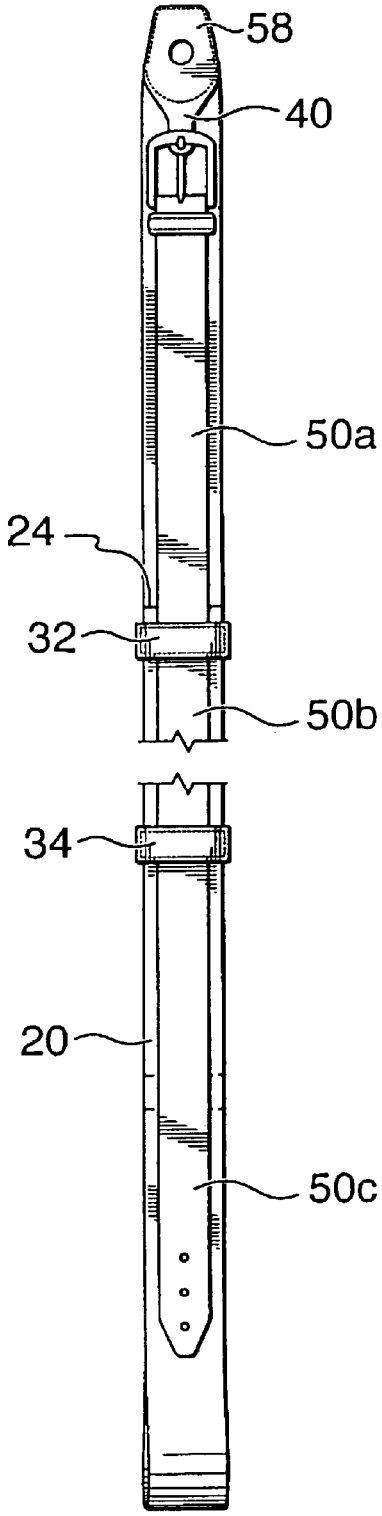
FIG. 5
AMENDED

BELT HOLDER

Matter enclosed in heavy brackets [ ] appears in the original patent but forms no part of this reissue specification; matter printed in italics indicates the additions made by reissue.

FIELD OF THE INVENTION

This invention relates to a holder for apparel belts. In particular, the invention relates to a sleeve-type holder used for the display, shipping and storage of apparel belts.

BACKGROUND OF THE INVENTION

Apparel belts are clothing accessories commonly worn by men, women, and children. The belts are generally threaded through a series of belt loops on a clothing garment, such as a pair of trousers or a skirt, and function to prevent the waist band of the clothing garment from slipping below the waist of the wearer. Belts are also commonly worn as fashion accessories. In many circumstances, a person wears a belt primarily to enhance the visual appeal of his or her apparel.

A conventional belt is comprised of an elongated strap having a series of orifices at one end and a belt buckle affixed to the other end. The belt buckle has a prong for insertion through any one of the orifices. A belt loop is attached to the side edges or the back of the belt strap near the buckle to retain the free end of the belt strap when the belt is buckled. Belt straps are manufactured from a variety of materials; most commonly leather, fabric or plastic. The buckles are conventionally manufactured from metal. There is a significant consumer demand for belts of high quality. These belts may have straps and belt loops manufactured from fine or exotic leathers and belt buckles manufactured from precious or semi-precious metals.

Belts are generally displayed for sale on plastic belt hangers designed to hook onto the rod of a merchandising display rack. The belt buckle is detachably affixed to the hanger in any one of a variety of means and the belt strap depends loosely therefrom. This form of belt display device enables a potential purchaser to remove the belt and hanger from the display rack and, by placing it around his or her waist, verify whether it is the correct size. An example of such a belt hanger is disclosed in U.S. Pat. No. 5,005,741 issued Apr. 9, 1991 (Kolton et al.). One problem with this type of belt hanger is that when a plurality of belts are hung from the same rod of a merchandising display rack, or otherwise displayed in close proximity, there is contact between adjacent belts. When consumers and merchandisers handle the belts, belt buckles and straps may be scratched or otherwise damaged resulting in either the sale of a substandarad product or the inability to sell a defective product. This situation is particularly problematic with high quality belts due to the potential for significant financial loss and the fact that belt straps made from exotic and fine leathers are particularly prone to marring.

Another of the drawbacks with this type of belt hanger is that it provides an insufficient substrate for the provision of information regarding the belt. While plastic belt hangers can normally accommodate a label indicating the size of the belt and, possibly, the brand name, they do not allow for the display of other product information or trade-marks.

It is also known to display belts for sale in clear plastic boxes such as the type shown in U.S. Pat. No. 3,044,605 issued Jul. 17, 1962 (Clement). While this type of holder protects the belts from damage more effectively than plastic belt hangers do, it does not adequately display the features of the belt. Merchandisers also find that the plastic boxes take up too much space. Furthermore, potential purchasers cannot feel the material from which the belt is constructed or verify whether the belt is the correct size without removing the belt from the box.

In addition to the aforementioned problems in displaying belts, there are also problems which arise from the conventional method of shipping belts from the manufacturer to the merchandiser. Belts are generally shipped from the manufacturer to the merchandiser in boxes. Typically, five to ten belts are formed into a coil and placed in a box. The box may contain one such coil or may contain two or more coils stacked on top of each other. With this method of packaging, there is nothing to protect a belt buckle or a belt strap from being scratched or otherwise marred by the buckle of an adjacent belt. In addition, after having been coiled for a period of time, leather belt straps tend to set in a coiled shape. Thus, once a shipment of belts is received by the merchandiser, the belts must be hung for a period of time to straighten them before they can be put on display. Although higher quality belts may be placed in a plastic or paper sleeve within the box, the plastic or paper sleeves are prone to slip off the belt and thus do not adequately protect it during shipping. Furthermore, if the belt is placed in a plastic or paper sleeve, the sleeve must be removed and discarded once the belt has been received by the merchandiser. The belt must then be installed on some form of hanger for display. Once the belt has been purchased, the sleeve is generally no longer available to cover the belt and it is therefore rolled and placed in a bag or box for the consumer. The form of packaging used by the merchandiser also fails to protect the belt from being scratched or otherwise marred.

Thus, there is a need for a belt holder which can be used to display an apparel belt and at the same time serve to protect it from physical damage. There is also a need for a means to protect apparel belts during shipping and in post-purchase packaging.

SUMMARY OF THE INVENTION

The present invention is a holder for an apparel belt which can be used as both a display holder and as a storage package. When used in either the display mode or the storage mode, the holed protects the belt from being scratched or otherwise physically damaged. The holder has a sleeve with an opening at one end thereof for receiving the strap of the belt, and a sleeve extension attached to the open end of the sleeve which acts as a backdrop for the exposed portion of the belt when the holder is used in its display mode and acts as a cover the buckle when the holder is used in its storage mode. In the display mode, the holder is hung on a merchandising display rack from an orifice in the free end of the sleeve extension. The sleeve extension has a means for retaining the buckle and a portion of the belt strap outside the sleeve to expose that portion of the belt. In the storage position, the buckle end of the belt is detached from the retaining means on the sleeve extension and the strap is more fully inserted into the sleeve. The sleeve extension is then folded over the top of the buckle and held to the front of the sleeve by a suitable attachment means.

The belt holder overcomes the deficiencies of the prior art belt display and packaging devices. In the display mode, the belt is sufficiently well exposed so that a consumer can adequately and conveniently view and touch it, yet is also protected by the sleeve and the sleeve extension which act as a buffer between adjacent belts on the rack. In the storage mode, the belt strap and the belt buckle are both well protected from physical damage. The holder can be used as a package in which to ship the belt to the merchandiser, a display hanger, a retail package, a gift package, a storage package and a travel package.

Thus in accordance with the present invention there is provided a holder for an apparel belt, said belt having a strap portion and a buckle portion, said holder comprising: an elongated sleeve having a front face and a back face, said sleeve adapted to receive said strap portion through an opening in one end thereof and hold said belt in a storage position wherein said strap portion is substantially fully received in said sleeve or a display position wherein said strap portion is partially received in said sleeve; and an elongated extension on said one end of said back face, said extension having a retaining means for retaining said belt in said display position thereby exposing said buckle portion and a part of said strap portion for display.

BRIEF DESCRIPTION OF THE DRAWINGS

FIG. 5 is a front elevational view of the belt holder with the belt shown in an alternative display position;

DETAILED DESCRIPTION OF THE PREFERRED EMBODIMENT

Figure 1:
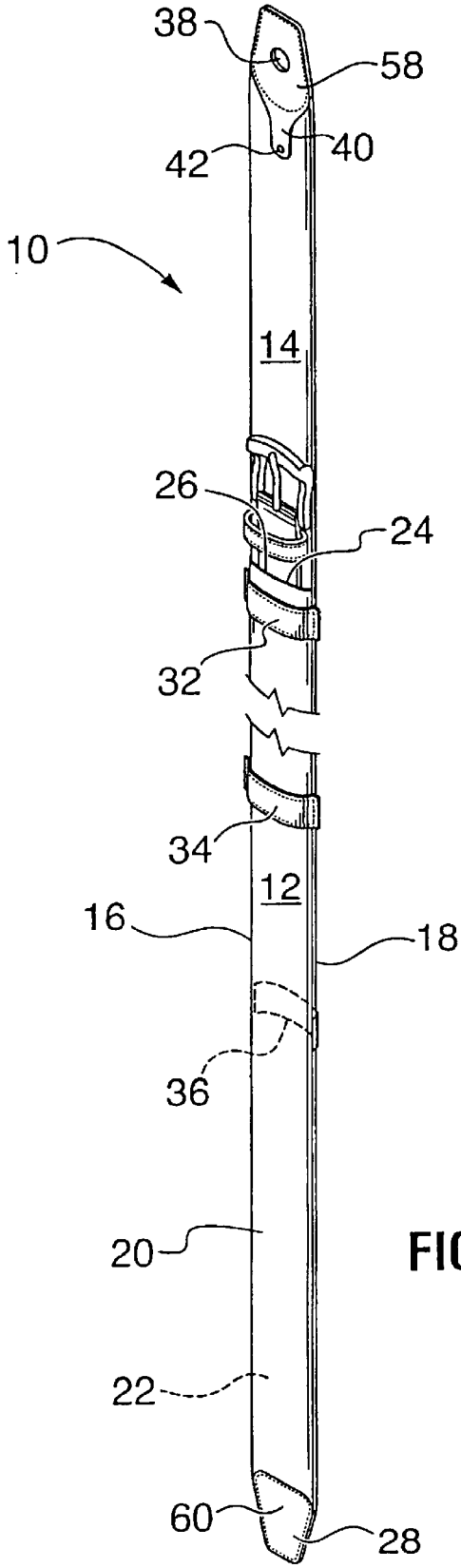
FIG. 1 is a perspective view of the belt holder of the present invention.

Referring to the drawings, FIG. 1 shows the belt holder of the present invention, generally indentified by reference numeral 10. Belt holder 10 consists of elongated sleeve 12 and elongated sleeve extension 14. Sleeve 12 may be constructed from two panels of material stitched together along side edges 16 and 18 to form front face 20 and back face 22, or, alternatively, from tubular material flattened to create a front face and a back face. Sleeve 12 may be constructed from a wide variety of materials including, but not limited to, canvas, denim, suede, plastic and leather. Sleeve extension 14 may be extended portion of the panel which forms back face 22, or may be a separate element sewn or otherwise attached to one end of back face 22. Sleeve 12 is generally of a width sufficient to hold an apparel belt of standard dimensions. Its length is variable depending on the length of the belt to be held. Generally, sleeve 12 is marginally shorter than the length of the belt to be held.

Figure 6:
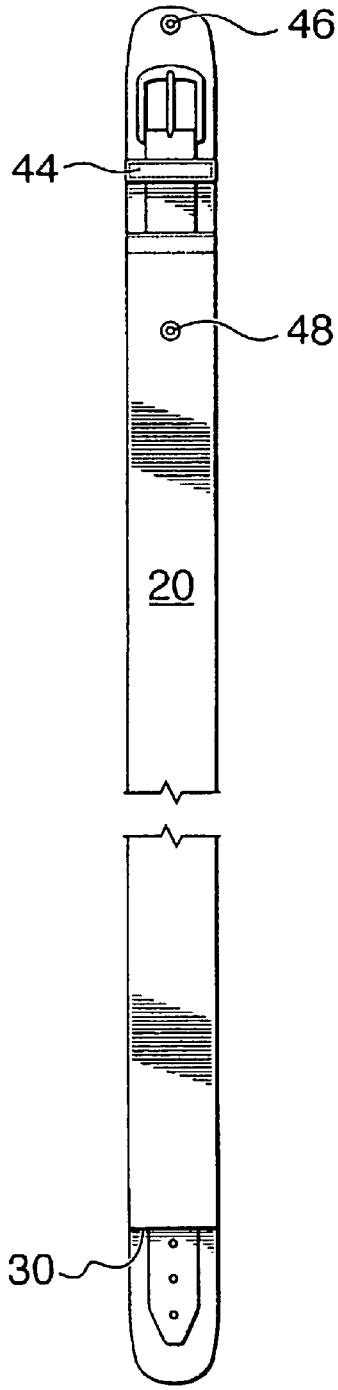
FIG. 6 is an alternative embodiment of the belt holder of the present invention.

Sleeve 12 has *a first* opening 24 at proximal end 26. Distal end 28 may have distal *or second* opening 30 as shown in FIG. 6 or may be sewn or otherwise closed as shown in FIG. 1. To assist in preventing front face 20 from stretching or sagging at opening 24, seam binding, reinforcement tape or any other suitable material may be applied (as illustrated in FIG. 6), or a line or lines of stitching may be sewn thereacross.

Transverse bands 32, 34 extend across front face 20 and are sewn or otherwise attached to side edges 16, 18. Bands 32, 34 may be leather, plastic, suede or any other suitable material. Back face 22 may also have transverse band 36.

Sleeve extension 14 has orifice 38 which is sized for installation on a post, peg or rod of a merchandising display rack. A rivet (not shown) may be used to reinforce orifice 38. Tongue 40 with prong orifice 42 is carefully fixed to sleeve extension and depends freely in the direction of opening 24.

An alternative embodiment is shown in FIG. 6. Sleeve extension 14 has transverse band 44 instead of a tongue with a prong orifice. Sleeve extension 14 also has primary closure means 46 adapted to co-operate with secondary closure means 48 on the front face 20. Any suitable closure means may be used, for example, a snap, hook and loop fastener, lace or button.

Figure 2A:
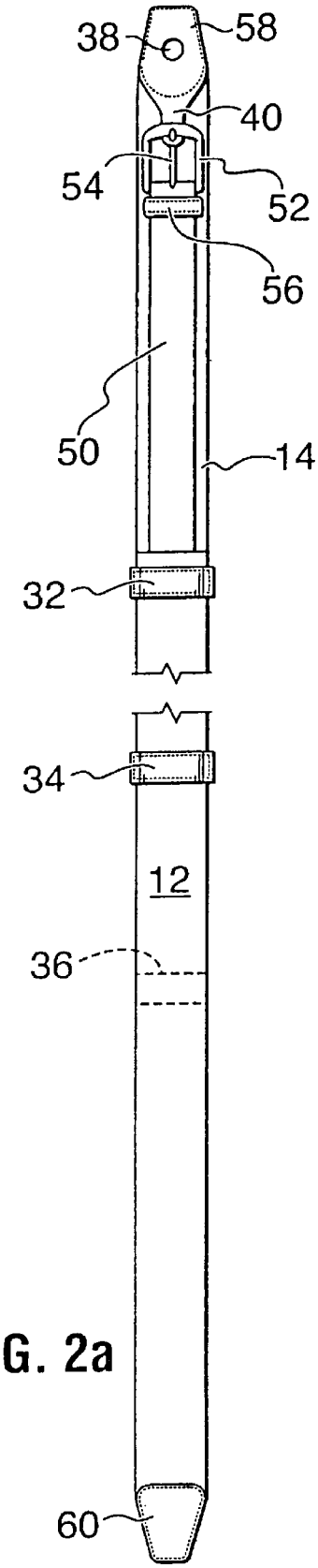
FIG. 2a is a front elevational view of the belt holder of the present invention shown with a belt inserted therein in the display position.
Figure 2B:
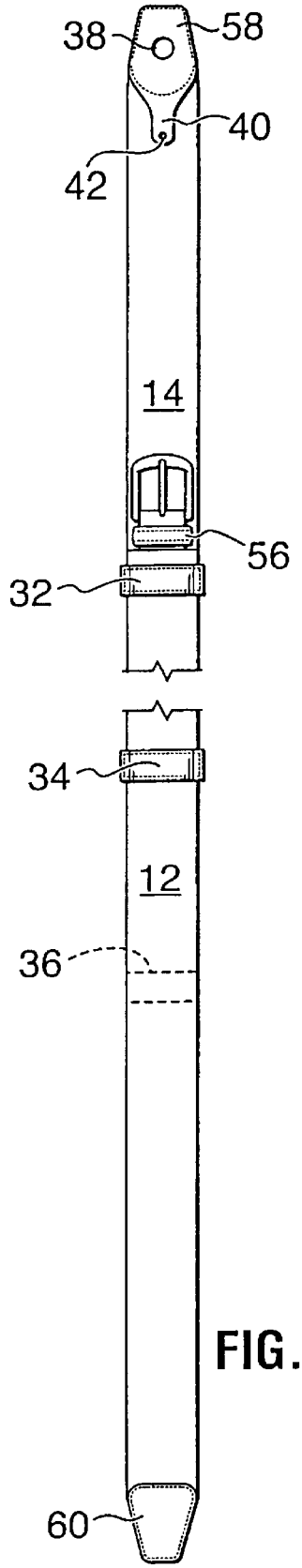
FIG. 2b is a front elevational view of the belt holder of the present invention shown with a belt in the sleeve without the sleeve extension folded over.
Figure 3:
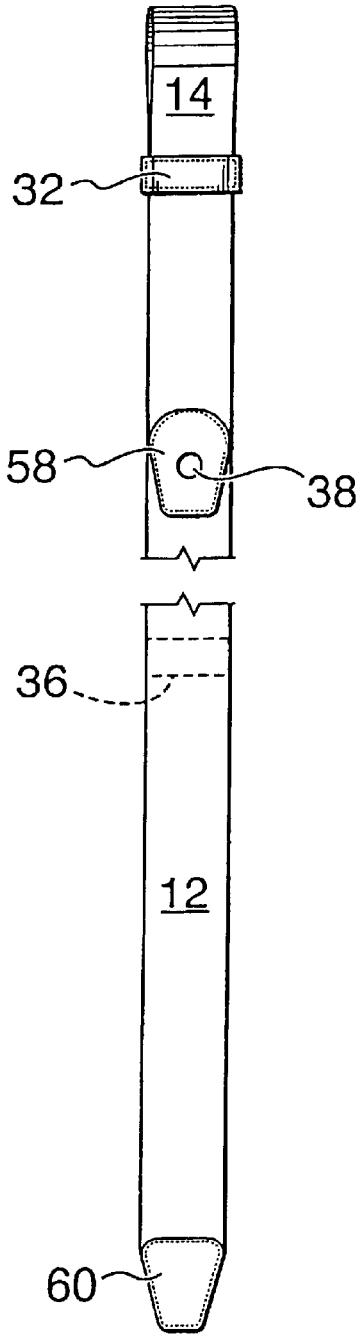
FIG. 3 is a front elevational view of the belt holder of the present invention shown with a belt in the storage position.
Figure 4:
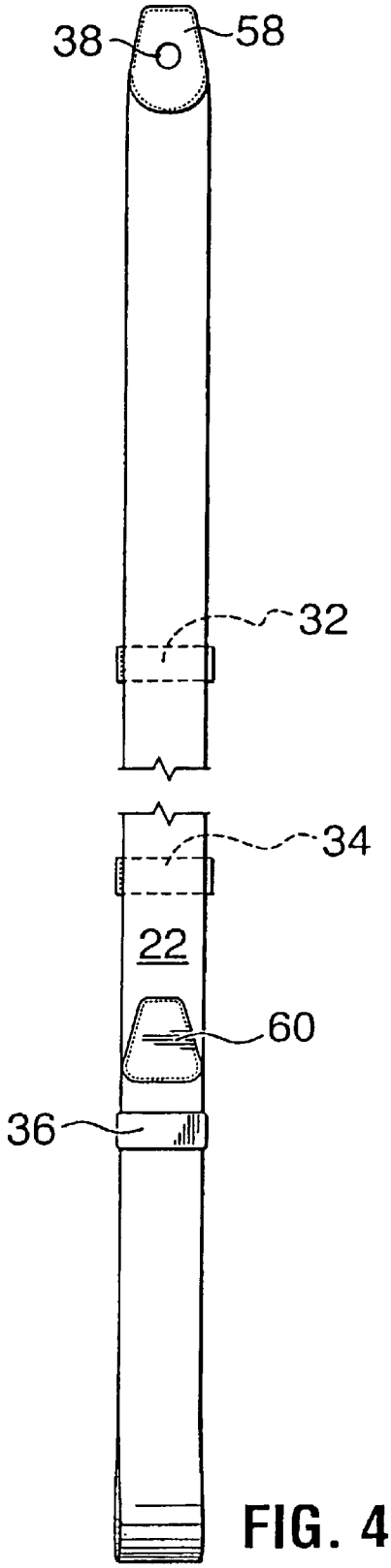
FIG. 4 is a rear elevational view of the belt holder with the distal end of the sleeve folded against its back face.

Belt holder 10 can advantageously be used either to display an apparel belt for sale or to package on apparel belt for transportation or storage. With reference to FIG. 2a, a conventional apparel belt having strap 50, buckle 52 with prong 54, and belt loop 56 is shown held in the display position in belt holder 10. Belt strap 50 is inserted in sleeve 12 such that the belt upper faces away from sleeve extension 14. The belt is buckled to tongue 40 by inserting prong 54 through prong orifice 42. The space between tongue 40 and sleeve opening 24 provides for buckle 52 and a sufficient portion of the upper of strap 50 to be exposed. When belt holder is being used in display mode, distal end of sleeve 12 may be folded backwards and inserted through the opening between transverse band 36 and back face 22 to avoid the excess length of sleeve 12 dangling at the bottom of holder 10. Distal end of sleeve 12 may be tapered to facilitate such insertion or may have sewn thereto a tapered tab such as that illustrated by reference numeral 60.

With the belt in the display position, belt holder 10 can be hung on a merchandise display rack by inserting a rod, post or peg through orifice 38. When displayed in this manner, a consumer can advantageously view the belt buckle and a portion of the strap sufficient to enable the consumer to assess the whether the belt meets with his or her approval. The consumer can also readily feel the belt to assess characteristics such as, for example, the quality of the leather. While on display in this manner, sleeve 12 and sleeve extension 14 fully protect the belt from being scratched or otherwise marred by adjacent belts. Belt holder 10 also serves to protect the belt from damage caused by the consumer removing the belt from the rack and handling it. Belt holder 10 also advantageously provides a large area for the display of product information, trademarks and other written matter. A further advantage of belt holder 10 is that it allows for a consumer to check the belt for size without removing it from the holder. This is particularly so if sleeve 12 has distal opening 30.

Belt holder 10 can also be used in an alternative display position as illustrated in FIG. 5. In this position, strap 50 is not inserted within sleeve 12 but rather threaded through the openings between transverse bands 32, 34 and front face 20. This allows substantially all of strap 50, *including first end section 50a, middle section 50b and second end section 50c,* to be exposed for display purposes. In this display position, sleeve 12 and sleeve extension 14 act as a protective barrier between adjacent belts on a merchandising display rack.

At the point of purchase of the belt, the display function has been served and the belt is placed in the storage position by releasing tongue 40 from belt buckle 52 and further inserting belt strap 50 into sleeve 12 until belt loop 56 abuts the edge of front face 20. Sleeve extension 14 is then folded over the end of belt buckle 52 and inserted through the opening between transverse band 32 and front face 20 thus covering both the front and back of the portion of the belt which remains outside sleeve 12. The free end of sleeve extension 14 may be tapered to facilitate insertion behind transverse band 32. In a preferred embodiment, free end of sleeve extension 14 has tapered tab 58 which provides reinforcement for orifice 38 and facilitates insertion of free end of sleeve extension behind transverse band 32. Tongue 50 may be integrated with tab 58 as illustrated in the drawings.

When the belt is in the storage position, both the buckle and the strap are protected from physical damage. The holder can therefore be advantageously used in this manner any time during which a belt is being transported or stored. For instance, belts can be shipped to the merchandiser in the storage position. The belt manufacturer places the belts in holders in the storage position and packages them in a box or other suitable shipping container. When the merchandiser receives the shipment of belts, he or she simply removes the holder from the shipping container, pulls the sleeve extension out from behind transverse band 32 and hangs the holder and belt on the merchandising display rack. Once sold, the merchandiser repositions the belt into the storage position and the holder acts a protective package for the consumer. The consumer will find it desirable to store the belt in the belt holder in either the storage or display positions at his or her residence throughout the life of the belt. Furthermore, if the belt is purchased as a gift, the belt holder provides an aesthetically pleasing gift package which enhances the apparent value of the belt. The belt holder can also advantageously be used for travel. Typically, when a person packs a belt in a travel case such as a suitcase, the person either coils the belt and places it in the case in the coiled position, or lays the belt flat in the case. In either event, the belt is vulnerable to being scratched or otherwise marred by rivets and other pieces of hardware or accessories on the inside of the case or by other contents of the case. The belt holder of the present invention protects the belt from being damaged while packed in a travel case. When the belt is in the holder in the storage position, the side of the buckle and a portion of the strap are visible which conveniently enables the user to identify the belt without removing it from the storage position.

Figure 7:
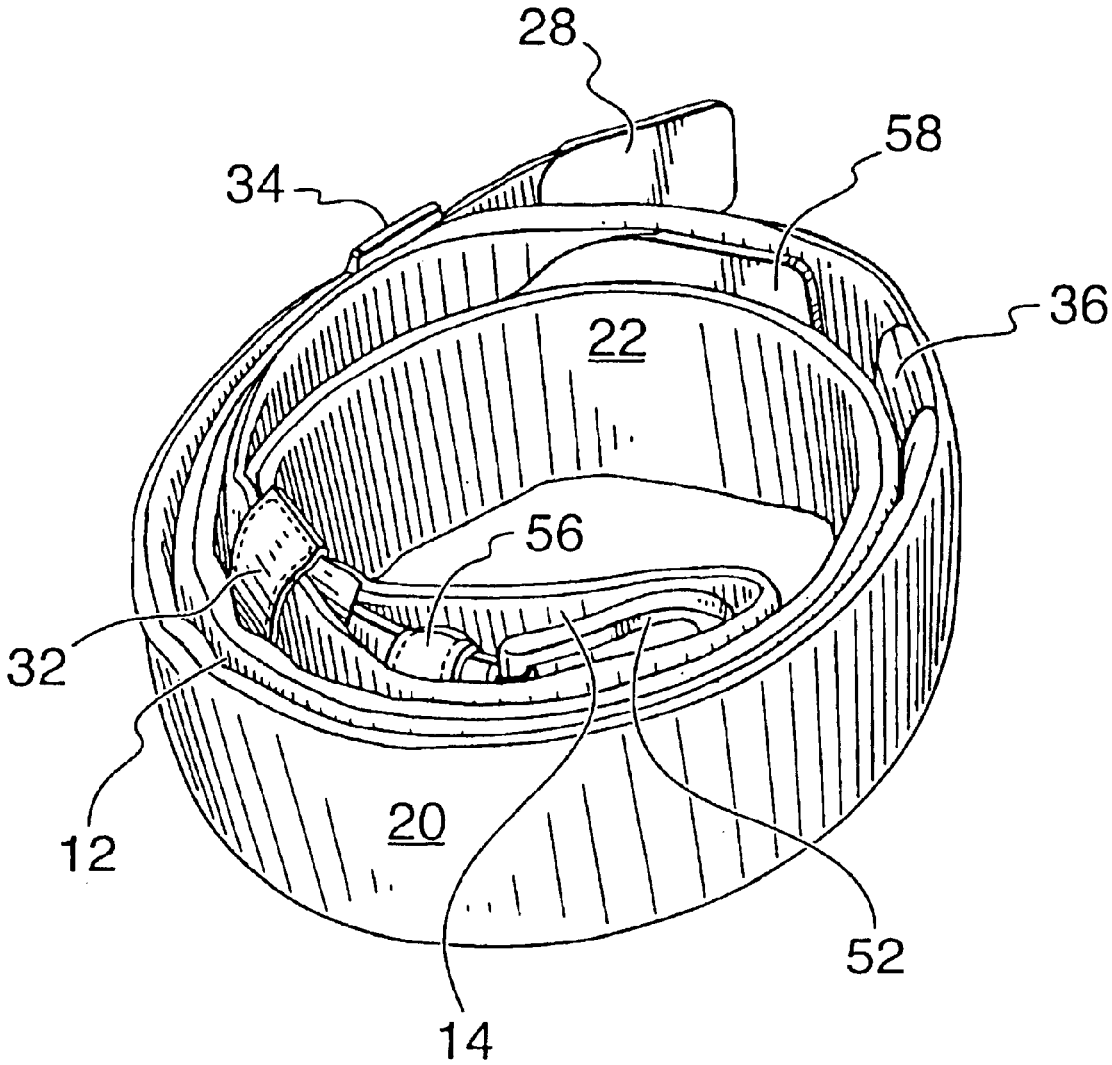
FIG. 7 is a perspective view of the belt holder of the present invention in a coiled position.

With the belt in the storage position, belt holder 10 can be coiled as illustrated in FIG. 7. Advantageously, transverse band 34 is exposed on the outside of the coil and distal end 28 can be inserted through the opening between transverse band 34 and front panel 20 thereby retaining holder 10 in a compact coiled position. Holder 10 may be so coiled when it is packaged for the consumer at the point of purchase, stored or transported.

Although the present invention has been described in terms of the presently preferred embodiments, one skilled in the art will understand that various modifications and alterations may be made without departing from the spirit and scope of the invention. Accordingly, the scope of the invention is not to be limited to the particular embodiments discussed herein but is defined by the terms of the following claims.

We claim:

1. A holder for an apparel belt, said belt having a strap portion and a buckle portion, said holder comprising:

(a) an elongated sleeve having a front face and a back face, said sleeve adapted to receive said strap portion through an opening in one end thereof and hold said belt in a storage position wherein said strap portion is substantially fully received in said sleeve or a display position wherein said strap portion is particularly received in said sleeve; and (b) an elongated extension on said one end of said back face, said extension having a retaining means for retaining said belt in said display position thereby exposing said bucket portion and a part of said strap portion for display.

2. The holder according to claim 1 wherein said elongated extension is adapted to fold over and cover said buckle portion when said belt is in said storage position.

3. The holder according to claim 2 additionally including means for fastening said extension to said sleeve.

4. The holder according to claim 3 wherein said means for fastening is a transverse band on the front face of said sleeve adapted to receive a portion of said extension between said band and said front face.

5. The holder according to claim 2, wherein said elongated extension includes means for hanging said holder from a rack.

6. The holder according to claim 5, wherein said means for hanging is an orifice.

7. The holder according to claim 2 wherein said buckle portion has a prong pivotally connected to one side of said buckle portion and adapted to abut an opposite side of said buckle portion and wherein said retaining means is a tongue with an orifice adapted to receive said prong between said one side and said opposite side.

8. The holder according to claim 2 wherein said belt includes a belt loop and said retaining means is a transverse band on said extension adapted to abut said loop.

9. The holder according to claim 2, wherein said sleeve contains opening on said front face.

10. The holder according to claim 2 wherein said front face includes at least two transverse bands adapted to retain said belt strap *portion* between said bands and said front face.

11. The holder according to claim 1, wherein said elongated extension includes means for hanging said holder from a rack.

12. The holder according to claim 11, wherein said means for hanging is an orifice.

13. The holder according to claim 1 wherein said buckle portion has a prong pivotally connected to one side of said buckle portion and adapted to abut an opposite side of said buckle portion and wherein said retaining means is a tongue with an orifice adapted to receive said prong between said one side and said opposite side.

14. The holder according to claim 1 wherein said belt includes a belt loop and said retaining means is a transverse band on said extension adapted to abut said loop.

15. The holder according to claim 1 wherein said sleeve contains openings on said front face.

16. The holder according to claim 1 wherein said front face includes at least two transverse bands adapted to retain said belt strap *portion* between said bands and said front face.

*17. A holder for an apparel belt, said belt having a strap portion, including first and second end sections, and a buckle portion adjacent said first end section, said holder comprising:*

*(A) an elongated sleeve having a front face, a back face, and first and second open ends, said sleeve adapted to receive said strap portion of said belt through said first open end and to hold said belt in a storage position wherein said strap portion of said belt extends through*

*said sleeve, with said second end section of said strap portion of said belt extending through said second open end, or a display position wherein said first end section of said strap portion of said belt is not received in said first open end, and*

*(B) an elongated extension on said back face at said first open end, said extension having a retaining means for retaining said belt in said display position thereby exposing said buckle portion and said first end section of said strap portion of said belt for display.*

*18. The holder according to claim 17 wherein said elongated extension is adapted to fold over and cover said buckle portion when said belt is in said storage position.*

*19. The holder according to claim 18, additionally including means for fastening said extension to said sleeve.*

*20. The holder according to claim 19 wherein said means for fastening is a transverse band on said front face of said sleeve adapted to receive a portion of said extension between said band and said front face.*

*21. The holder according to claim 18, wherein said elongated extension includes means for hanging said holder from a rack.*

*22. The holder according to claim 21, wherein said means for hanging is an orifice.*

*23. The holder according to claim 18 wherein said buckle portion has a prong pivotally connected to one side of said buckle portion and adapted to abut an opposite side of said buckle portion and wherein said retaining means is a tongue with an orifice adapted to receive said prong between said one side and said opposite side.*

*24. The holder according to claim 18 wherein said belt includes a belt loop and said retaining means is a transverse band on said extension adapted to abut said belt loop.*

*25. The holder according to claim 18, wherein said sleeve contains an opening on said front face.*

*26. The holder according to claim 18 wherein said front face includes at least two transverse bands adapted to retain said belt strap portion between said bands and said front face.*

*27. The holder according to claim 17, wherein said elongated extension includes means for hanging said holder from a rack.*

*28. The holder according to claim 27, wherein said means for hanging is an orifice.*

*29. The holder according to claim 17 wherein said buckle portion has a prong pivotally connected to one side of said buckle portion and adapted to abut an opposite side of said buckle portion and wherein said retaining means is a tongue with an orifice adapted to receive said prong between said one side and said opposite side.*

*30. The holder according to claim 17 wherein said belt includes a belt loop and said retaining means is a transverse band on said extension adapted to abut said belt loop.*

*31. The holder according to claim 17 wherein said sleeve contains openings on said front face.*

*32. The holder according to claim 17 wherein said front face includes at least two transverse bands adapted to retain said belt strap portion between said bands and said front face.*

*33. The holder for an apparel belt, said belt having a strap portion including a first end section adjacent a buckle portion adjacent said first end section, a middle section and a second end section, said holder comprising:*

*(A) an elongated sleeve having a front face a back face and first and second open ends, said sleeve adapted to receive said strap portion of said belt through said first open end and hold said belt in a storage position wherein said first end section and said middle section of said strap portion are substantially received in said sleeve, and said second end section of said strap portion of said belt extends through said second open end, or a display position wherein said first end section of said strap portion is not received in said sleeve, and*

*(B) an elongated extension on said back face at said first open end, said elongated extension having a retaining means for retaining said belt in said display position thereby exposing said buckle portion and said first end section of said strap portion of said belt for display.*

*34. The holder according to claim 33 wherein said elongated extension is adapted to fold over and cover said buckle portion when said belt is in said storage position.*

*35. The holder according to claim 34, additionally including means for fastening said extension to said sleeve.*

*36. The holder according to claim 35 wherein said means for fastening is a transverse band on said front face of said sleeve adapted to receive a portion of said extension between said band and said front face.*

*37. The holder according to claim 34, wherein said elongated extension includes means for hanging said holder from a rack.*

*38. The holder according to claim 37, wherein said means for hanging is an orifice.*

*39. The holder according to claim 34 wherein said buckle portion has a prong pivotally connected to one side of said buckle portion and adapted to abut an opposite side of said buckle portion and wherein said retaining means is a tongue with an orifice adapted to receive said prong between said one side and said opposite side.*

*40. The holder according to claim 34 wherein said belt includes a belt loop and said retaining means is a transverse band on said extension adapted to abut said belt loop.*

*41. The holder according to claim 34, wherein said sleeve contains an opening on said front face.*

*42. The holder according to claim 34 wherein said front face includes at least two transverse bands adapted to retain said belt strap portion between said bands and said front face.*

*43. The holder according to claim 33, wherein said elongated extension includes means for hanging said holder from a rack.*

*44. The holder according to claim 43, wherein said means for hanging is an orifice.*

*45. The holder according to claim 33 wherein said buckle portion has a prong pivotally connected to one side of said buckle portion and adapted to abut an opposite side of said buckle portion and wherein said retaining means is a tongue with an orifice adapted to receive said prong between said one side and said opposite side.*

*46. The holder according to claim 33 wherein said belt includes a belt loop and said retaining means is a transverse band on said extension adapted to abut said belt loop.*

*47. The holder according to claim 33 wherein said sleeve contains openings on said front face.*

*48. The holder according to claim 33 wherein said front face includes at least two transverse bands adapted to retain said belt strap portion between said bands and said front face.*

* * * * *

UNITED STATES PATENT AND TRADEMARK OFFICE

CERTIFICATE OF CORRECTION

PATENT NO. : RE 40,309 E
APPLICATION NO. : 11/104246
DATED : May 13, 2008
INVENTOR(S) : Milton Lackman It is certified that error appears in the above-identified patent and that said Letters Patent is hereby corrected as shown below:

Column 6, line 3, the word "particularly" should be changed to -- partially --

Signed and Sealed this

First Day of July, 2008

JON W. DUDAS
*Director of the United States Patent and Trademark Office*